United States Patent
Su

(10) Patent No.: US 12,490,134 B2
(45) Date of Patent: Dec. 2, 2025

(54) METHOD AND APPARATUS FOR FEEDING BACK CHANNEL STATE INFORMATION

(71) Applicant: DATANG MOBILE COMMUNICATIONS EQUIPMENT CO., LTD., Beijing (CN)

(72) Inventor: Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 456 days.

(21) Appl. No.: 18/016,330

(22) PCT Filed: Jun. 29, 2021

(86) PCT No.: PCT/CN2021/103120
§ 371 (c)(1),
(2) Date: Jan. 14, 2023

(87) PCT Pub. No.: WO2022/012322
PCT Pub. Date: Jan. 20, 2022

(65) Prior Publication Data
US 2023/0292167 A1    Sep. 14, 2023

(30) Foreign Application Priority Data
Jul. 15, 2020   (CN) .......................... 202010682922.0

(51) Int. Cl.
*H04W 4/00*     (2018.01)
*H04B 7/06*     (2006.01)
(Continued)

(52) U.S. Cl.
CPC .......... *H04W 24/10* (2013.01); *H04B 7/0626* (2013.01); *H04W 24/08* (2013.01)

(58) Field of Classification Search
CPC .................................................... H04W 24/10
See application file for complete search history.

(56) References Cited

U.S. PATENT DOCUMENTS

2013/0121276 A1*  5/2013  Kim ...................... H04W 72/23
                                               370/329
2017/0202014 A1   7/2017  Moon et al.
(Continued)

FOREIGN PATENT DOCUMENTS

CN       104579585 A    4/2015
CN       105490718 A    4/2016
(Continued)

OTHER PUBLICATIONS

International Searching Authority, English Translation of the Written Opinion of the International Searching Authority, WIPO, Sep. 28, 2021, pp. 1-4. (Year: 2021).*
(Continued)

*Primary Examiner* — Elisabeth Benoit Magloire
(74) *Attorney, Agent, or Firm* — KILPATRICK TOWNSEND & STOCKTON LLP

(57) ABSTRACT

Disclosed in the present disclosure are a method and apparatus for feeding back channel state information. In the present disclosure, a terminal sends capability information of the terminal to a network device; the terminal measures a downlink reference signal sent by the network device so as to obtain measurement information, and calculates the measurement information on the basis of the Physical Downlink Shared Channel (PDSCH) transmission mode corresponding to the capability information so as to obtain Channel State Information (CSI) for feedback; and the terminal sends the CSI to the network device.

14 Claims, 2 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 2018/0092085 A1* | 3/2018 | Shaheen | H04W 36/0094 |
| 2018/0139750 A1* | 5/2018 | Takahashi | H04W 8/24 |
| 2018/0375627 A1* | 12/2018 | Suzuki | H04J 11/00 |
| 2019/0158155 A1 | 5/2019 | Park et al. | |
| 2019/0159049 A1* | 5/2019 | Kim | H04B 7/0417 |
| 2020/0236587 A1* | 7/2020 | Kim | H04L 1/1614 |
| 2020/0244285 A1* | 7/2020 | Kim | H03M 13/036 |

FOREIGN PATENT DOCUMENTS

| | | |
|---|---|---|
| CN | 105794142 A | 7/2016 |
| CN | 109560842 A | 4/2019 |
| CN | 110661556 A | 1/2020 |
| CN | 110830215 A | 2/2020 |
| CN | 110995329 A | 4/2020 |
| CN | 111328130 A | 6/2020 |
| WO | 2019099659 A1 | 5/2019 |
| WO | 2020125400 A1 | 6/2020 |

OTHER PUBLICATIONS

Nokia et al., "Enhancements on Multi TRP/Panel Transmission", 3GPP TSG RAN WG1 #98bis Meeting, Chongqing, China, Oct. 14-20, 2019, total 22 pages, R1-1910915.

* cited by examiner

METHOD AND APPARATUS FOR FEEDING BACK CHANNEL STATE INFORMATION

CROSS-REFERENCE OF RELATED APPLICATIONS

The present application is a National Stage of International Application No. PCT/CN2021/103120, filed Jun. 29, 2021, which claims the priority from Chinese Patent Application No. 202010682922.0, filed with the China National Intellectual Property Administration on Jul. 15, 2020 and entitled "Method and Apparatus for Feeding Back Channel State Information", which is hereby incorporated by reference in its entirety.

FIELD OF DISCLOSURE

The disclosure relates to the field of wireless communication technologies, and particularly to a method and apparatus for feeding back channel state information.

BACKGROUND

In order to improve the coverage of the cell edge and provide the more balanced quality of service within the service area, the multi-point cooperation is an important means in the New Radio (NR) system. From the perspective of network morphology, the network deployment with a large number of distributed access points plus centralized baseband processing will be more conducive to providing a balanced user experience rate, and significantly reduce the delay and signaling overhead caused by trans-regional handover. With the increase of frequency bands, the relatively dense deployment of access points is also required from the perspective of ensuring the network coverage.

In a high frequency band, with the increase of the integration degree of the active antenna equipment, it will be more inclined to use a modular active antenna array. Each antenna array of Transmission Reference Points (TRPs) can be divided into several relatively independent antenna panels, so the shape of the entire array and the number of ports can be flexibly adjusted according to the deployment scenario and service requirements. The antenna panels or TRPs (the antenna panels and TRPs are collectively referred to as TRPs hereafter) can also be connected by optical fiber for the more flexible distributed deployment, and the edge coverage is improved and the edge spectrum utilization efficiency or edge transmission rate is increased through the cooperative transmission among TRPs.

In a multi-point coordinated scheme, Physical Downlink Control Channels (PDCCHs) can be used to schedule their respective Physical Downlink Shared Channels (PDSCHs) respectively, which is called M-DCI (Multi-Downlink Control Information) scheme. In this scheme, each TRP may be independently scheduled, and measure and report the Channel Statement Information (CSI) independently. The flexibility is relatively high, but the reported CSI cannot reflect the PDSCH transmission situation.

BRIEF SUMMARY

Embodiments of the disclosure provide a method and apparatus for feeding back channel state information, to enable the CSI to reflect the PDSCH transmission situation.

In one embodiment, a method for feeding back CSI is provided, including: sending, by a terminal, capability information of the terminal to a network device; measuring, by the terminal, a downlink reference signal sent by the network device to obtain measurement information, and calculating, by the terminal, the measurement information based on a PDSCH transmission mode corresponding to the capability information to obtain CSI for feedback; and sending, by the terminal, the CSI to the network device.

In some embodiments, the calculating, by the terminal, the measurement information based on the PDSCH transmission mode corresponding to the capability information to obtain the CSI for feedback, includes: calculating the measurement information based on the PDSCH transmission mode corresponding to the capability information configured by default to obtain the CSI for feedback.

In some embodiments, the calculating, by the terminal, the measurement information based on the PDSCH transmission mode corresponding to the capability information configured by default to obtain the CSI for feedback, includes: calculating the measurement information based on a first PDSCH transmission mode configured by default to obtain the CSI for feedback, when the capability information indicates that the terminal supports at least two PDSCHs that overlap in a time domain and do not overlap in a frequency domain; where the first PDSCH transmission mode is: a transmission mode in which at least two PDSCHs overlap in the time domain and do not overlap in the frequency domain.

In some embodiments, the calculating, by the terminal, the measurement information based on the PDSCH transmission mode corresponding to the capability information configured by default to obtain the CSI for feedback, includes:

calculating the measurement information based on a first PDSCH transmission mode configured by default or a second PDSCH transmission mode configured by default or the first and second transmission modes configured by default to obtain the CSI for feedback, or calculating the measurement information based on at least one of the first and second transmission modes configured by default to obtain the CSI for feedback, when the capability information indicates that the terminal supports at least two PDSCHs that overlap in the time domain and do not overlap in the frequency domain and supports at least two PDSCHs with completely overlapped time-frequency resources;

or, calculating the measurement information based on the first PDSCH transmission mode configured by default to obtain the CSI for feedback, when the capability information indicates that the terminal supports at least two PDSCHs that overlap in the time domain and do not overlap in the frequency domain and does not support at least two PDSCHs with completely overlapped time-frequency resources;

where the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; when calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

In some embodiments, the calculating, by the terminal, the measurement information based on the PDSCH transmission mode corresponding to the capability information configured by default to obtain the CSI for feedback, includes:
    calculating the measurement information based on a first PDSCH transmission mode configured by default to obtain the CSI for feedback, when the capability information indicates that the terminal supports at least two PDSCHs that overlap in the time domain and do not overlap in the frequency domain and supports or does not support at least two PDSCHs with partially overlapped time-frequency resources;
    or, calculating the measurement information based on the first PDSCH transmission mode configured by default or a second PDSCH transmission mode configured by default or the first and second transmission modes configured by default to obtain the CSI for feedback, or calculating the measurement information based on at least one of the first and second transmission modes configured by default to obtain the CSI for feedback, when the capability information indicates that the terminal supports at least two PDSCHs that overlap in the time domain and do not overlap in the frequency domain, supports or does not support at least two PDSCHs with partially overlapped time-frequency resources, and supports at least two PDSCHs with completely overlapped time-frequency resources;
    or, calculating the measurement information based on the first PDSCH transmission mode configured by default to obtain the CSI for feedback, when the capability information indicates that the terminal supports at least two PDSCHs that overlap in the time domain and do not overlap in the frequency domain and does not support at least two PDSCHs with partially overlapped time-frequency resources and at least two PDSCHs with completely overlapped time-frequency resources;
    where the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; when calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

In some embodiments, the calculating, by the terminal, the measurement information based on the PDSCH transmission mode corresponding to the capability information to obtain the CSI for feedback, includes: calculating the measurement information based on the PDSCH transmission mode corresponding to the capability information according to indication of the network device to obtain the CSI for feedback.

In some embodiments, the calculating the measurement information based on the PDSCH transmission mode corresponding to the capability information according to indication of the network device to obtain the CSI for feedback, includes: receiving indication information sent by the network device, where the indication information is configured to indicate the PDSCH transmission mode based on which the terminal calculates the CSI, and the PDSCH transmission mode indicated by the indication information matches with the capability information of the terminal; and calculating the measurement information based on the PDSCH transmission mode indicated by the indication information to obtain the CSI for feedback.

In some embodiments, calculating the measurement information based on the PDSCH transmission mode corresponding to the capability information according to indication of the network device to obtain the CSI for feedback, includes:
    calculating the measurement information based on a first PDSCH transmission mode indicated by the indication information or a second PDSCH transmission mode indicated by the indication information or the first and second transmission modes indicated by the indication information to obtain the CSI for feedback, or calculating the measurement information based on at least one of the first and second transmission modes indicated by the indication information to obtain the CSI for feedback, when the capability information indicates that the terminal supports at least two PDSCHs that overlap in the time domain and do not overlap in the frequency domain and supports at least two PDSCHs with completely overlapped time-frequency resources;
    or, calculating the measurement information based on the first PDSCH transmission mode indicated by the indication information to obtain the CSI for feedback, when the capability information indicates that the terminal supports at least two PDSCHs that overlap in the time domain and do not overlap in the frequency domain and does not support at least two PDSCHs with completely overlapped time-frequency resources;
    where the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; when calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

In some embodiments, calculating the measurement information based on the PDSCH transmission mode corresponding to the capability information according to indication of the network device to obtain the CSI for feedback, includes: calculating the measurement information based on a first PDSCH transmission mode indicated by the indication information to obtain the CSI for feedback, when the capability information indicates that the terminal supports at least two PDSCHs that overlap in the time domain and do not overlap in the frequency domain and supports or does not support at least two PDSCHs with partially overlapped time-frequency resources;
    or, calculating the measurement information based on the first PDSCH transmission mode indicated by the indication information or a second PDSCH transmission mode indicated by the indication information or the first and second transmission modes indicated by the indication information to obtain the CSI for feedback, or calculating the measurement information based on at least one of the first and second transmission modes indicated by the indication information to obtain the CSI for feedback, when the capability information indicates that the terminal supports at least two PDSCHs that overlap in the time domain and do not overlap in the frequency domain, supports or does not support at least two PDSCHs with partially overlapped time-frequency resources, and supports at least two PDSCHs with completely overlapped time-frequency resources;

or, calculating the measurement information based on the first PDSCH transmission mode indicated by the indication information to obtain the CSI for feedback, when the capability information indicates that the terminal supports at least two PDSCHs that overlap in the time domain and do not overlap in the frequency domain and does not support at least two PDSCHs with partially overlapped time-frequency resources and at least two PDSCHs with completely overlapped time-frequency resources;

where the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; when calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

In some embodiments, calculating the measurement information based on the PDSCH transmission mode corresponding to the capability information according to indication of the network device to obtain the CSI for feedback, includes: receiving PDSCH resource allocation information sent by the network device, where the PDSCH resource allocation information is configured to indicate time-frequency resources of at least two PDSCHs, and the PDSCH resource allocation information matches with the capability information sent by the terminal; and calculating the measurement information based on the PDSCH transmission mode corresponding to the PDSCH resource allocation information to obtain the CSI for feedback.

In some embodiments, calculating the measurement information based on the PDSCH transmission mode corresponding to the PDSCH resource allocation information to obtain the CSI for feedback, includes: calculating the measurement information based on a corresponding PDSCH transmission mode according to a first PDSCH time-frequency resource indicated by the PDSCH resource allocation information to obtain the CSI for feedback, when the capability information indicates that the terminal supports at least two PDSCHs that overlap in the time domain and do not overlap in the frequency domain; where the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain.

In some embodiments, calculating the measurement information based on the PDSCH transmission mode corresponding to the PDSCH resource allocation information to obtain the CSI for feedback, includes: calculating the measurement information based on a PDSCH transmission mode corresponding to a first or second PDSCH time-frequency resource indicated by the PDSCH resource allocation information to obtain the CSI for feedback, when the capability information indicates that the terminal supports at least two PDSCHs that overlap in the time domain and do not overlap in the frequency domain and supports at least two PDSCHs with completely overlapped time-frequency resources;

or, calculating the measurement information based on a PDSCH transmission mode corresponding to the first PDSCH time-frequency resource indicated by the PDSCH resource allocation information to obtain the CSI for feedback, when the capability information indicates that the terminal supports at least two PDSCHs that overlap in the time domain and do not overlap in the frequency domain and does not support at least two PDSCHs with completely overlapped time-frequency resources;

where the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain; the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain.

In some embodiments, calculating the measurement information based on the PDSCH transmission mode corresponding to the PDSCH resource allocation information to obtain the CSI for feedback, includes:

calculating the measurement information based on a PDSCH transmission mode corresponding to a first PDSCH time-frequency resource, a second PDSCH time-frequency resource allocation or a third time-frequency resource allocation indicated by the PDSCH resource allocation information to obtain the CSI for feedback, when the capability information indicates that the terminal supports at least two PDSCHs that overlap in the time domain and do not overlap in the frequency domain, supports at least two PDSCHs with partially overlapped time-frequency resources and supports at least two PDSCHs with completely overlapped time-frequency resources;

or, calculating the measurement information based on a PDSCH transmission mode corresponding to the first PDSCH time-frequency resource or the second time-frequency resource allocation indicated by the PDSCH resource allocation information to obtain the CSI for feedback, when the capability information indicates that the terminal supports at least two PDSCHs that overlap in the time domain and do not overlap in the frequency domain, does not support at least two PDSCHs with partially overlapped time-frequency resources and supports at least two PDSCHs with completely overlapped time-frequency resources;

or, calculating the measurement information based on a PDSCH transmission mode corresponding to the first PDSCH time-frequency resource or the third time-frequency resource allocation indicated by the PDSCH resource allocation information to obtain the CSI for feedback, when the capability information indicates that the terminal supports at least two PDSCHs that overlap in the time domain and do not overlap in the frequency domain, supports at least two PDSCHs with partially overlapped time-frequency resources and does not support at least two PDSCHs with completely overlapped time-frequency resources;

or, calculating the measurement information based on a PDSCH transmission mode corresponding to the first PDSCH time-frequency resource indicated by the PDSCH resource allocation information to obtain the CSI for feedback, when the capability information indicates that the terminal supports at least two PDSCHs that overlap in the time domain and do not overlap in the frequency domain, does not support at least two PDSCHs with partially overlapped time-frequency resources and does not support at least two PDSCHs with completely overlapped time-frequency resources;

or, calculating the measurement information based on a PDSCH transmission mode corresponding to the first PDSCH time-frequency resource or a third PDSCH time-frequency resource indicated by the PDSCH resource allocation information to obtain the CSI for feedback, when the capability information indicates that the terminal supports at least two PDSCHs that overlap in the time domain and do not overlap in the frequency domain and supports at least two PDSCHs with partially overlapped time-frequency resources;

or, calculating the measurement information based on a PDSCH transmission mode corresponding to the first PDSCH time-frequency resource indicated by the PDSCH resource allocation information to obtain the CSI for feedback, when the capability information indicates that the terminal supports at least two PDSCHs that overlap in the time domain and do not overlap in the frequency domain and does not support at least two PDSCHs with partially overlapped time-frequency resources;

where the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain; the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain; the third PDSCH time-frequency resource is: at least two PDSCHs that partially overlap in the time domain, and the PDSCH transmission mode corresponding to the third PDSCH time-frequency resource is: a transmission mode in which at least two PDSCHs overlap in the time domain and do not overlap in the frequency domain.

In some embodiments, calculating the measurement information to obtain the CSI for feedback, includes: calculating the CSI for feedback based on using beams corresponding to at least two downlink reference signal resources to receive the at least two PDSCHs when calculating the measurement information to obtain the CSI for feedback, when the terminal uses at least two beams to receive the downlink reference signal; selecting one of at least two downlink reference signal resources and calculating the CSI for feedback based on using a beam corresponding to the selected downlink reference signal resource to receive the at least two PDSCHs or based on using other beams to receive the at least two PDSCHs when calculating the measurement information to obtain the CSI for feedback, when the terminal uses one beam to receive the downlink reference signal.

In one embodiment, a method for feeding back CSI is provided, including:
  receiving, by a network device, capability information of a terminal sent by the terminal;
  receiving, by the network device, CSI sent by the terminal, where the CSI is obtained by the terminal by calculating measurement information of a downlink reference signal based on a PDSCH transmission mode corresponding to the capability information.

In some embodiments, the method further includes: instructing, by the network device, the terminal to determine the CSI for feedback based on the PDSCH transmission mode corresponding to the capability information according to the capability information of the terminal.

In some embodiments, instructing, by the network device, the terminal to determine the CSI for feedback based on the PDSCH transmission mode corresponding to the capability information according to the capability information of the terminal, includes: sending, by the network device, indication information to the terminal, where the indication information is configured to indicate the PDSCH transmission mode based on which the terminal calculates the CSI, and the PDSCH transmission mode indicated by the indication information matches with the capability information of the terminal.

In some embodiments, sending, by the network device, indication information to the terminal, where the indication information is configured to indicate the PDSCH transmission mode based on which the terminal calculates the CSI, includes:
  sending indication information for indicating a first PDSCH transmission mode, or sending indication information for indicating a second PDSCH transmission mode, or sending indication information for indicating the first and second PDSCH transmission modes, when the capability information indicates that the terminal supports at least two PDSCHs that overlap in the time domain and do not overlap in the frequency domain and supports at least two PDSCHs with completely overlapped time-frequency resources; or, sending the indication information for indicating the first PDSCH transmission mode, when the capability information indicates that the terminal supports at least two PDSCHs that overlap in the time domain and do not overlap in the frequency domain and does not support at least two PDSCHs with completely overlapped time-frequency resources; where the first PDSCH transmission mode is: a transmission mode in which at least two PDSCHs overlap in the time domain and do not overlap in the frequency domain; and the second PDSCH transmission mode is: a transmission mode in which at least two PDSCHs completely overlap in the time domain and frequency domain.

In some embodiments, sending, by the network device, indication information to the terminal, where the indication information is configured to indicate the PDSCH transmission mode based on which the terminal calculates the CSI, includes:
  sending indication information for indicating a first PDSCH transmission mode, when the capability information indicates that the terminal supports at least two PDSCHs that overlap in the time domain and do not overlap in the frequency domain and supports or does not support at least two PDSCHs with partially overlapped time-frequency resources;

or, sending indication information for indicating the first PDSCH transmission mode or a second PDSCH transmission mode or the first and second PDSCH transmission modes, when the capability information indicates that the terminal supports at least two PDSCHs that overlap in the time domain and do not overlap in the frequency domain, supports or does not support at least two PDSCHs with partially overlapped time-frequency resources, and supports at least two PDSCHs with completely overlapped time-frequency resources;

or, sending the indication information for indicating the first PDSCH transmission mode, when the capability information indicates that the terminal supports at least two PDSCHs that overlap in the time domain and do not overlap in the frequency domain and does not support at least two PDSCHs with partially overlapped time-frequency resources and at least two PDSCHs with completely overlapped time-frequency resources;

where the first PDSCH transmission mode is: a transmission mode in which at least two PDSCHs overlap in the time domain and do not overlap in the frequency domain; and the second PDSCH transmission mode is: a transmission mode in which at least two PDSCHs completely overlap in the time domain and frequency domain.

In some embodiments, sending, by the network device, indication information to the terminal, includes: sending, by the network device, dedicated signaling to the terminal, where the dedicated signaling carries the indication information; or sending, by the network device, dynamic signaling to the terminal, where the dynamic signaling carries the indication information; or sending, by the network device, dedicated signaling carrying first indication information to the terminal, and sending dynamic signaling carrying second indication information to the terminal when the PDSCH transmission mode changes; where the first indication information is configured to indicate a PDSCH transmission mode set, and the second indication information is configured to indicate one PDSCH transmission mode in the PDSCH transmission mode set that includes at least a first PDSCH transmission mode and a second PDSCH transmission mode; where the first PDSCH transmission mode is: a transmission mode in which at least two PDSCHs overlap in the time domain and do not overlap in the frequency domain; and the second PDSCH transmission mode is: a transmission mode in which at least two PDSCHs completely overlap in the time domain and frequency domain.

In some embodiments, instructing, by the network device, the terminal to determine the CSI for feedback based on the PDSCH transmission mode corresponding to the capability information according to the capability information of the terminal, includes: sending, by the network device, PDSCH resource allocation information to the terminal, where the PDSCH resource allocation information is configured to indicate time-frequency resources of at least two PDSCHs, and the PDSCH resource allocation information matches with the capability information sent by the terminal.

In some embodiments, sending, by the network device, PDSCH resource allocation information to the terminal, where the PDSCH resource allocation information is configured to indicate time-frequency resources of at least two PDSCHs, includes: sending the PDSCH resource allocation information for indicating a first PDSCH time-frequency resource to the terminal, when the capability information indicates that the terminal supports at least two PDSCHs that overlap in the time domain and do not overlap in the frequency domain; where the first PDSCH time-frequency resource is: at least two PDSCHs that overlap in the time domain and do not overlap in the frequency domain; and the PDSCH transmission mode corresponding to the first PDSCH time-frequency resource is: a transmission mode in which at least two PDSCHs overlap in the time domain and do not overlap in the frequency domain.

In some embodiments, sending, by the network device, PDSCH resource allocation information to the terminal, where the PDSCH resource allocation information is configured to indicate time-frequency resources of at least two PDSCHs, includes: sending the PDSCH resource allocation information for indicating a first or second PDSCH time-frequency resource to the terminal, when the capability information indicates that the terminal supports at least two PDSCHs that overlap in the time domain and do not overlap in the frequency domain and supports at least two PDSCHs with completely overlapped time-frequency resources; or, sending the PDSCH resource allocation information for indicating the first PDSCH time-frequency resource to the terminal, when the capability information indicates that the terminal supports at least two PDSCHs that overlap in the time domain and do not overlap in the frequency domain and does not support at least two PDSCHs with completely overlapped time-frequency resources; where the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain; the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain.

In some embodiments, sending, by the network device, PDSCH resource allocation information to the terminal, where the PDSCH resource allocation information is configured to indicate time-frequency resources of at least two PDSCHs, includes:
  sending the PDSCH resource allocation information for indicating a first PDSCH time-frequency resource, a second PDSCH time-frequency resource allocation or a third time-frequency resource allocation to the terminal, when the capability information indicates that the terminal supports at least two PDSCHs that overlap in the time domain and do not overlap in the frequency domain, supports at least two PDSCHs with partially overlapped time-frequency resources and supports at least two PDSCHs with completely overlapped time-frequency resources;
  or, sending the PDSCH resource allocation information for indicating the first PDSCH time-frequency resource or the second time-frequency resource allocation to the terminal, when the capability information indicates that the terminal supports at least two PDSCHs that overlap in the time domain and do not overlap in the frequency domain, does not support at least two PDSCHs with partially overlapped time-frequency resources and supports at least two PDSCHs with completely overlapped time-frequency resources;
  or, sending the PDSCH resource allocation information for indicating the first PDSCH time-frequency resource or the third time-frequency resource allocation to the terminal, when the capability information indicates that the terminal supports at least two PDSCHs that overlap in the time domain and do not overlap in the frequency domain, supports at least two PDSCHs with partially overlapped time-frequency resources and does not support at least two PDSCHs with completely overlapped time-frequency resources;

or, sending the PDSCH resource allocation information for indicating the first PDSCH time-frequency resource to the terminal, when the capability information indicates that the terminal supports at least two PDSCHs that overlap in the time domain and do not overlap in the frequency domain, does not support at least two PDSCHs with partially overlapped time-frequency resources and does not support at least two PDSCHs with completely overlapped time-frequency resources;

or, sending the PDSCH resource allocation information for indicating the first PDSCH time-frequency resource or a third PDSCH time-frequency resource to the terminal, when the capability information indicates that the terminal supports at least two PDSCHs that overlap in the time domain and do not overlap in the frequency domain and supports at least two PDSCHs with partially overlapped time-frequency resources;

or, sending the PDSCH resource allocation information for indicating the first PDSCH time-frequency resource to the terminal, when the capability information indicates that the terminal supports at least two PDSCHs that overlap in the time domain and do not overlap in the frequency domain and does not support at least two PDSCHs with partially overlapped time-frequency resources;

where the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain; the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain; the third PDSCH time-frequency resource is: at least two PDSCHs that partially overlap in the time domain, and the PDSCH transmission mode corresponding to the third PDSCH time-frequency resource is: a transmission mode in which at least two PDSCHs overlap in the time domain and do not overlap in the frequency domain.

In one embodiment, a terminal is provided, including: a sending device configured to send capability information of the terminal to a network device; and a processing device configured to measure a downlink reference signal sent by the network device to obtain measurement information, and calculate the measurement information based on a PDSCH transmission mode corresponding to the capability information to obtain CSI for feedback; where the sending device is further configured to send the CSI to the network device.

In one embodiment, a network device is provided, including: a receiving device configured to receive capability information of a terminal sent by the terminal; the receiving device being further configured to receive CSI sent by the terminal, where the CSI is obtained by the terminal by calculating measurement information of a downlink reference signal based on a PDSCH transmission mode corresponding to the capability information.

In one embodiment, a terminal is provided, including: a processor, a memory and a transceiver; where the transceiver receives and sends data under control of the processor; the memory stores computer instructions; and the processor is configured to read the computer instructions to perform the method described in any implementation of the embodiments described above.

In one embodiment, a network device is provided, including: a processor, a memory and a transceiver; where the transceiver receives and sends data under control of the processor; the memory stores computer instructions; and the processor is configured to read the computer instructions to perform the method described in any implementation of the embodiments described above.

In one embodiment, a computer readable storage medium is provided, where the computer readable storage medium stores computer executable instructions which are configured to cause a computer to perform the method described in any implementation of the embodiments described above or the method described in any implementation of the embodiments described above.

In the above embodiments of the disclosure, after measuring the downlink reference signal sent by the network device to obtain the measurement information, the terminal can calculate the measurement information based on the PDSCH transmission mode corresponding to the capability information reported by the terminal to obtain the CSI for feedback. When calculating the CSI, the terminal can calculate the CSI using the matching CSI calculation method based on the PDSCH transmission mode corresponding to its own capability, so the calculated CSI matches with the PDSCH transmission mode supported by the terminal, to enable the calculated CSI to reflect the PDSCH transmission situation of the terminal.

BRIEF DESCRIPTION OF THE DRAWINGS

In order to illustrate the embodiments of the disclosure more clearly, the accompanying figures which need to be used in embodiments of the disclosure will be introduced below briefly. The accompanying figures introduced below are only some embodiments of the disclosure.

DETAILED DESCRIPTION OF THE EMBODIMENTS

Figure 1:
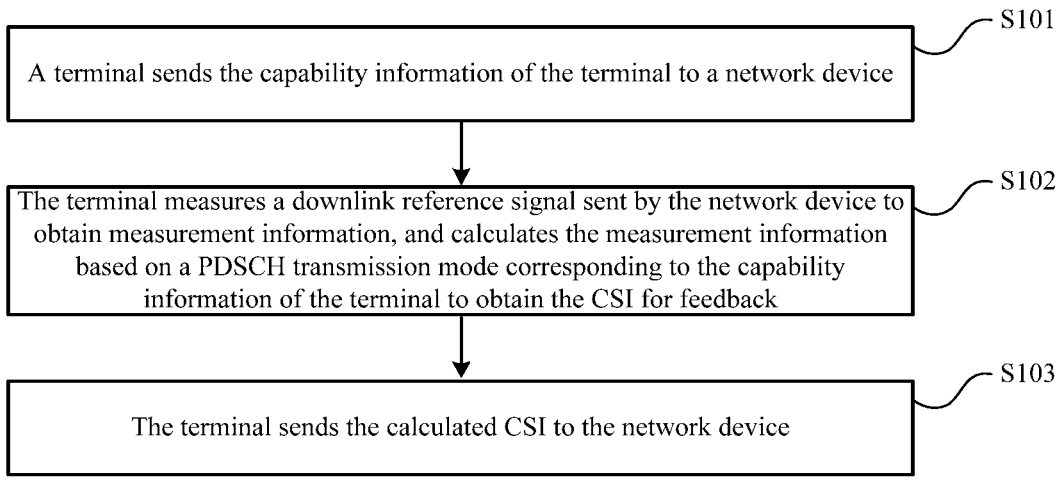
FIG. 1 exemplarily shows a schematic flowchart of a method for feeding back CSI implemented on the terminal side In some embodiments.

In order to make the embodiments of the disclosure clearer, the disclosure will be further illustrated below in details with reference to the accompanying figures. The described embodiments are merely a part of the embodiments of the disclosure but not all embodiments.

(1) In some embodiments, the nouns "network" and "system" are often used alternately.

(2) The term "a plurality of" In some embodiments refers to two or more, and other quantifiers are similar thereto.

(3) "and/or" describes the association relationship of the associated objects, and indicates that there may be three relationships, for example, A and/or B may represent: only A, both A and B, and only B. The character "I" generally indicates that the associated objects have a kind of "or" relationship.

(4) Network device is a device that provides the wireless communication function for the terminal, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the disclosure may also be a device that provides the wireless communication function for the terminal in other communication systems that may appear in the future.

(5) Terminal is a device that can provide users with voice and/or data connectivity. For example, the terminal device includes a handheld device with wireless connection function, a vehicle-mounted device, etc. At present, the terminal device may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self driving, wireless terminal in the smart grid, wireless terminal in the transportation safety, wireless terminal in the smart city, or wireless terminal in the smart home, etc.

Embodiments of the disclosure provide a method and apparatus for feeding back channel state information, to enable the CSI to reflect the PDSCH transmission situation. In some embodiments, after measuring the downlink reference signal sent by the network device to obtain the measurement information, the terminal can calculate the measurement information based on the PDSCH transmission mode corresponding to the capability information reported by the terminal to obtain the CSI for feedback. When calculating the CSI, the terminal can calculate the CSI using the matching CSI calculation method based on the PDSCH transmission mode corresponding to its own capability, so the calculated CSI matches with the PDSCH transmission mode supported by the terminal, to enable the calculated CSI to reflect the PDSCH transmission situation of the terminal.

In some embodiments, the capability of the terminal refers to the capability of the terminal to support the PDSCH transmission mode or PDSCH resource allocation mode, that is, the terminal capability may indicate the PDSCH transmission mode or PDSCH resource allocation mode supported by the terminal. In one embodiment, there may be several capabilities as follows.

Basic capability (hereinafter described as capability A): a terminal supporting M-DCI needs to support the PDSCH resource allocation mode or PDSCH transmission mode in which at least two PDSCHs completely or partially overlap in the time domain but do not overlap in the frequency domain.

On the basis of the above capability A, the terminal can further support or not support the PDSCH resource allocation mode or PDSCH transmission mode in which the time-frequency resources of at least two PDSCHs completely overlap, called capability B1 and capability B2 respectively.

Capability B1: support the PDSCH resource allocation mode or PDSCH transmission mode in which the time-frequency resources of at least two PDSCHs completely overlap on the basis of the basic capability (capability A).

Capability B2: not support the PDSCH resource allocation mode or PDSCH transmission mode in which the time-frequency resources of at least two PDSCHs completely overlap on the basis of the basic capability (capability A).

On the basis of the above capability A, capability B1 or capability B2, the terminal can further support or not support the PDSCH resource allocation mode or PDSCH transmission mode in which the time-frequency resources of at least two PDSCHs partially overlap, called capability C1 to capability C6 respectively.

Capability C1: support the PDSCH resource allocation mode or PDSCH transmission mode in which the time-frequency resources of at least two PDSCHs partially overlap on the basis of the basic capability (capability A).

Capability C2: not support the PDSCH resource allocation mode or PDSCH transmission mode in which the time-frequency resources of at least two PDSCHs partially overlap on the basis of the basic capability (capability A).

Capability C3: support the PDSCH resource allocation mode or PDSCH transmission mode in which the time-frequency resources of at least two PDSCHs partially overlap on the basis of the capability B1.

Capability C4: not support the PDSCH resource allocation mode or PDSCH transmission mode in which the time-frequency resources of at least two PDSCHs partially overlap on the basis of the capability B1.

Capability C5: support the PDSCH resource allocation mode or PDSCH transmission mode in which the time-frequency resources of at least two PDSCHs partially overlap on the basis of the capability B2.

Capability C6: not support the PDSCH resource allocation mode or PDSCH transmission mode in which the time-frequency resources of at least two PDSCHs partially overlap on the basis of the capability B2.

In some embodiments, the capability of the terminal refers to the capability of the terminal to support the PDSCH transmission mode or PDSCH resource allocation mode, that is, is used to indicate the supported PDSCH transmission mode or PDSCH resource allocation mode, so there is a correspondence between the capability information sent by the terminal and the PDSCH transmission mode or PDSCH resource allocation mode. The terminal can calculate the detected measurement information according to the PDSCH transmission mode corresponding to the reported capability information, and to obtain the CSI for feedback.

In some embodiments, there is a following correspondence between the terminal capability and the PDSCH transmission mode (or the corresponding PDSCH resource allocation mode) based on which the CSI is calculated.

The capability A corresponds to the first PDSCH transmission mode (or the first PDSCH resource allocation mode). In the case that the terminal reports the capability A, the measurement information obtained from measurement may be calculated according to the first PDSCH transmission mode to obtain the CSI for feedback when the CSI is calculated, where the first PDSCH transmission mode is: a transmission mode in which at least two PDSCHs overlap in the time domain and do not overlap in the frequency domain.

The capability B1 corresponds to the first PDSCH transmission mode, or corresponds to the second PDSCH transmission mode (or the corresponding PDSCH resource allocation mode), or corresponds to the first and second PDSCH transmission modes. In the case that the terminal reports the capability B1, the measurement information obtained from measurement may be calculated according to the first PDSCH transmission mode to obtain the CSI for feedback, or the measurement information obtained from measurement may be calculated according to the second PDSCH transmission mode to obtain the CSI for feedback, or the measurement information obtained from measurement may be calculated respectively according to the first and second PDSCH transmission modes to obtain the CSI for feedback, when the CSI is calculated, where the second PDSCH transmission mode is: a transmission mode in which at least two PDSCHs completely overlap in the time domain and frequency domain.

The capability B2 corresponds to the first PDSCH transmission mode. In the case that the terminal reports the capability B2, the measurement information obtained from measurement may be calculated according to the first PDSCH transmission mode to obtain the CSI for feedback when the CSI is calculated.

The capability C1 corresponds to the first PDSCH transmission mode. In the case that the terminal reports the capability C1, the measurement information obtained from measurement may be calculated according to the first PDSCH transmission mode to obtain the CSI for feedback when the CSI is calculated.

The capability C2 corresponds to the first PDSCH transmission mode. In the case that the terminal reports the capability C2, the measurement information obtained from measurement may be calculated according to the first PDSCH transmission mode to obtain the CSI for feedback when the CSI is calculated.

The capability C3 corresponds to the first PDSCH transmission mode, or corresponds to the second PDSCH transmission mode, or corresponds to the first and second PDSCH transmission modes. In the case that the terminal reports the capability C3, the measurement information obtained from measurement may be calculated according to the first PDSCH transmission mode to obtain the CSI for feedback, or the measurement information obtained from measurement may be calculated according to the second PDSCH transmission mode to obtain the CSI for feedback, or the measurement information obtained from measurement may be calculated respectively according to the first and second PDSCH transmission modes to obtain the CSI for feedback, when the CSI is calculated.

The capability C4 corresponds to the first PDSCH transmission mode, or corresponds to the second PDSCH transmission mode, or corresponds to the first and second PDSCH transmission modes. In the case that the terminal reports the capability C4, the measurement information obtained from measurement may be calculated according to the first PDSCH transmission mode to obtain the CSI for feedback, or the measurement information obtained from measurement may be calculated according to the second PDSCH transmission mode to obtain the CSI for feedback, or the measurement information obtained from measurement may be calculated respectively according to the first and second PDSCH transmission modes to obtain the CSI for feedback, when the CSI is calculated.

The capability C5 corresponds to the first PDSCH transmission mode. In the case that the terminal reports the capability C5, the measurement information obtained from measurement may be calculated according to the first PDSCH transmission mode to obtain the CSI for feedback when the CSI is calculated.

The capability C6 corresponds to the first PDSCH transmission mode. In the case that the terminal reports the capability C6, the measurement information obtained from measurement may be calculated according to the first PDSCH transmission mode to obtain the CSI for feedback when the CSI is calculated.

The embodiments of the disclosure will be described below with reference to the drawings.

FIG. 1 exemplarily shows a schematic flowchart of a method for feeding back CSI implemented on the terminal side in an embodiment of the disclosure. As shown in the figure, the process may include the following steps.

S101: a terminal sends the capability information of the terminal to a network device.

In this step, the capability information of the terminal may be indication information for identifying the capability of the terminal, for example, several bits may be used to identify the capability of the terminal, where different values of these bits correspond to different terminal capabilities.

The terminal may report its own capability information when accessing a cell, or send the capability information of the terminal to the network device in other situations where the terminal capability needs to be reported.

S102: the terminal measures a downlink reference signal sent by the network device to obtain measurement information, and calculates the measurement information based on a PDSCH transmission mode corresponding to the capability information of the terminal to obtain the CSI for feedback.

Here, the downlink reference signal may be a CSI-RS, and the terminal may perform measurement according to the CSI-RS resources configured on the case side to obtain the measurement information. The downlink reference signal may also be other reference signal that can be used for channel state measurement, which is not limited in the embodiment of the disclosure.

Here, the CSI for feedback may include at least one of PMI (Precoding Matrix Indicator), RI (RANK Indicator), CRI (CSI-RS resource indication).

In some embodiments, the PDSCH transmission modes based on which the terminal calculates the CSI may include a first PDSCH transmission mode and a second PDSCH transmission mode. Depending on the specific situation, the terminal may calculate the CSI based on the first PDSCH transmission mode (that is, calculate the CSI by using the assumption of the first PDSCH transmission mode), or calculate the CSI based on the second PDSCH transmission mode (that is, calculate the CSI by using the assumption of the second PDSCH transmission mode), or calculate the CSI based on the first PDSCH transmission mode and the second PDSCH transmission mode respectively.

Here, an implementation in which the terminal calculates the CSI based on the first PDSCH transmission mode may be: the terminal independently calculates the CSI for each PDSCH, that is, the interference from other PDSCHs is not considered when calculating the CSI for any one of the PDSCHs.

An implementation in which the terminal calculates the CSI based on the second PDSCH transmission mode may be: the terminal processes signals of other PDSCHs as interference when calculating the CSI for each PDSCH.

S103: the terminal sends the calculated CSI to the network device.

In some embodiments, the terminal may calculate the CSI based on using one or more beams to receive the PDSCH according to specific conditions.

In some embodiments, if the terminal uses at least two beams to receive the downlink reference signal, the CSI for feedback is calculated based on using beams corresponding to at least two downlink reference signal resources to receive at least two PDSCHs when calculating the measurement information to obtain the CSI for feedback.

In some other embodiments, if the terminal uses one beam to receive the downlink reference signal, one of at least two downlink reference signal resources is selected and the CSI for feedback is calculated based on using a beam corresponding to the selected downlink reference signal resource to receive the at least two PDSCHs or based on using other beams to receive the at least two PDSCHs when calculating the measurement information to obtain the CSI for feedback.

For example, if the resources of two PDSCHs overlap in the time domain but not overlap in the frequency domain, there is no mutual interference between the two PDSCHs. In the FR2 frequency band area, if the terminal can use two typeD QCLs (QCL is the English abbreviation of Quasi Co-Location, and can be understood as beam here) at the same time for reception, then the CSI is calculated respectively based on using the typeD QCLs corresponding to two CSI-RS resources to receive different PDSCHs when calculating the CSI; if the terminal cannot use two typeD QCLs to receive two PDSCHs at the same time, the terminal may autonomously choose to calculate the CSI based on using the typeD QCL corresponding to one of two CSI-RS resources for reception or based on using other typeD QCL for reception when calculating the CSI.

For another example, if the resources of two PDSCH completely overlap, there will be interference between the two PDSCH. In the FR2 frequency band area, if the terminal can use two typeD QCLs to receive two PDSCHs at the same time, then the CSI is calculated respectively based on using the typeD QCLs corresponding to two CSI-RS resources to receive different PDSCHs when calculating the CSI; if the terminal cannot use two typeD QCLs to receive two PDSCHs at the same time, the terminal may autonomously choose to calculate the CSI based on using the typeD QCL corresponding to one of two CSI-RS resources to receive the PDSCH or based on using other typeD QCL to receive the PDSCH when calculating the CSI.

Figure 2:
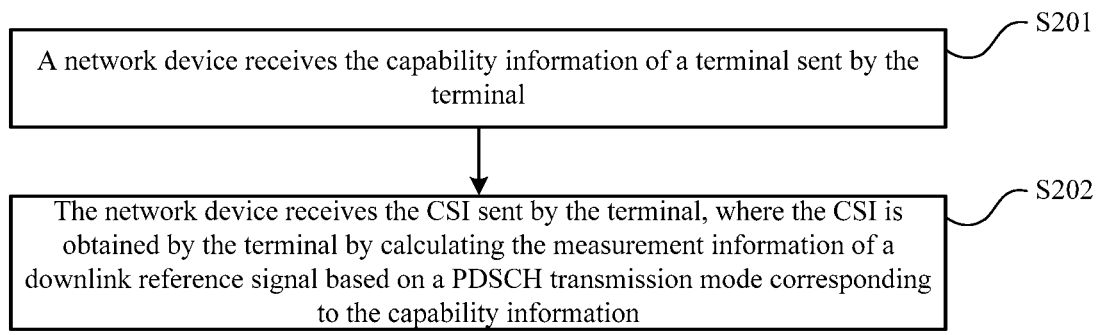
FIG. 2 exemplarily shows a schematic flowchart of a method for feeding back CSI implemented on the network side In some embodiments.

FIG. 2 exemplarily shows a schematic flowchart of a method for feeding back CSI implemented on the network side in an embodiment of the disclosure.

On the network side, the network device configures the M-DCI transmission. For example: there are two different CORESETPoolIndexes (CORESET pool indexes) in the Control Resource set (CORESET) configured for the terminal, that is, one part of the CORESET is associated with one CORESETPoolIndex value (such as 0), and the other part of the CORESET is associated with the other CORESETPoolIndex value (such as 1), for scheduling different PDSCHs.

The network device configures the downlink reference signal (such as CSI-RS) resources used for CSI measurement. In some embodiments, there may be two following ways for configuration.

In a first way: configure at least two CSI-RS resources, which are respectively used to measure the channel information of different TRPs, where different TRPs correspond to different PDSCHs, that is, different TRPs transmit or schedule different PDSCHs.

In a second way: configure multiple CSI-RS resources for each TRP, where at least one CSI-RS resource is used to measure its channel information, and the other CSI-RS resources are used to measure the interference caused by another TRP transmission. Here, different CSI-RS ports may correspond to different layers, for measuring the interference.

Further, other CSI-RS resources may also be configured to measure other interference and noise.

As shown in the figure, the process may include the following steps:

S201: a network device receives the capability information of a terminal sent by the terminal; and S202: the network device receives the CSI sent by the terminal, where the CSI is obtained by the terminal by calculating the measurement information of a downlink reference signal based on a PDSCH transmission mode corresponding to the capability information.

In some embodiments, the network device may instruct the terminal to calculate the CSI based on the PDSCH transmission mode corresponding to its capability information. The specific implementations refer to the description below.

In the above embodiments of the disclosure, after measuring the downlink reference signal sent by the network device to obtain the measurement information, the terminal can calculate the measurement information based on the PDSCH transmission mode corresponding to the capability information reported by the terminal to obtain the CSI for feedback. In the process of calculating the CSI, the CSI may be calculated according to the scheduling mode (that is, PDSCH transmission mode) that the terminal may use, to reflect the channel quality in the case of M-DCI transmission more accurately, and select the channel state information such as PMI, RI or CRI for feedback more accurately.

In some embodiments of the disclosure, the correspondence between the terminal capability and the PDSCH transmission mode (or PDSCH resource allocation mode) may be pre-configured or pre-agreed, for example, the above-mentioned correspondence may be configured by default. In this case, the terminal may calculate the detected measurement information based on the PDSCH transmission mode corresponding to the capability information of the terminal configured by default to obtain the CSI for feedback.

In the following, the correspondence between the terminal capability and the PDSCH transmission mode is configured by default as an example, to illustrate the implementation process in which the terminal calculates the measurement information based on the PDSCH transmission mode corresponding to the capability information of the terminal to obtain the CSI for feedback. In one embodiment, there may be several cases as follows.

Case 1-1: The system is configured with a correspondence between the terminal capability A and the first PDSCH transmission mode by default. If the capability information sent by the terminal in S101 indicates that the terminal has the capability A, then the terminal calculates the measurement information according to the first PDSCH transmission mode corresponding to the capability A based on the above correspondence configured by default to obtain the CSI for feedback.

Case 1-2: The system is configured with a correspondence between the terminal capability B1 and the first PDSCH transmission mode by default. If the capability information sent by the terminal in S101 indicates that the terminal has the capability B1, then the terminal calculates the measurement information according to the first PDSCH transmission mode corresponding to the capability B1 based on the above correspondence configured by default to obtain the CSI for feedback.

The system may also be configured with a correspondence between the terminal capability B1 and the second PDSCH transmission mode by default. If the capability information sent by the terminal in S101 indicates that the terminal has the capability B1, then the terminal calculates the measurement information according to the second PDSCH transmission mode corresponding to the capability B1 based on the above correspondence configured by default to obtain the CSI for feedback.

The system may also be configured with a correspondence between the terminal capability B1 and the first and second PDSCH transmission modes by default. If the capability information sent by the terminal in S101 indicates that the terminal has the capability B1, then the terminal calculates the measurement information respectively according to the first and second PDSCH transmission modes corresponding to the capability B1 based on the above correspondence configured by default to obtain the CSI for feedback.

In some other embodiments, the system is configured with the correspondence between the terminal capability B1 and the first and second PDSCH transmission modes by default, and the terminal may autonomously select at least one of the first and second PDSCH transmission modes corresponding to the capability B1 configured by default, and calculate the measurement information based on the selected PDSCH transmission mode to obtain the CSI for feedback. In one embodiment, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 1-3: The system is configured with a correspondence between the terminal capability B2 and the first PDSCH transmission mode by default. If the capability information sent by the terminal in S101 indicates that the terminal has the capability B2, then the terminal calculates the measurement information according to the first PDSCH transmission mode corresponding to the capability B2 based on the above correspondence configured by default to obtain the CSI for feedback.

Case 1-4: The system is configured with a correspondence between the terminal capability C1 and the first PDSCH transmission mode by default. If the capability information sent by the terminal in S101 indicates that the terminal has the capability C1, then the terminal calculates the measurement information according to the first PDSCH transmission mode corresponding to the capability C1 based on the above correspondence configured by default to obtain the CSI for feedback.

Case 1-5: The system is configured with a correspondence between the terminal capability C2 and the first PDSCH transmission mode by default. If the capability information sent by the terminal in S101 indicates that the terminal has the capability C2, then the terminal calculates the measurement information according to the first PDSCH transmission mode corresponding to the capability C2 based on the above correspondence configured by default to obtain the CSI for feedback.

Case 1-6: The system is configured with a correspondence between the terminal capability C3 and the first PDSCH transmission mode by default. If the capability information sent by the terminal in S101 indicates that the terminal has the capability C3, then the terminal calculates the measurement information according to the first PDSCH transmission mode corresponding to the capability C3 based on the above correspondence configured by default to obtain the CSI for feedback.

The system may also be configured with a correspondence between the terminal capability C3 and the second PDSCH transmission mode by default. If the capability information sent by the terminal in S101 indicates that the terminal has the capability C3, then the terminal calculates the measurement information according to the second PDSCH transmission mode corresponding to the capability C3 based on the above correspondence configured by default to obtain the CSI for feedback.

The system may also be configured with a correspondence between the terminal capability C3 and the first and second PDSCH transmission modes by default. If the capability information sent by the terminal in S101 indicates that the terminal has the capability C3, then the terminal calculates the measurement information respectively according to the first and second PDSCH transmission modes corresponding to the capability C3 based on the above correspondence configured by default to obtain the CSI for feedback.

In some other embodiments, the system is configured with the correspondence between the terminal capability C3 and the first and second PDSCH transmission modes by default, and the terminal may autonomously select at least one of the first and second PDSCH transmission modes corresponding to the capability C3 configured by default, and calculate the measurement information based on the selected PDSCH transmission mode to obtain the CSI for feedback. In one embodiment, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 1-7: The system is configured with a correspondence between the terminal capability C4 and the first PDSCH transmission mode by default. If the capability information sent by the terminal in S101 indicates that the terminal has the capability C4, then the terminal calculates the measurement information according to the first PDSCH transmission mode corresponding to the capability C4 based on the above correspondence configured by default to obtain the CSI for feedback.

The system may also be configured with a correspondence between the terminal capability C4 and the second PDSCH transmission mode by default. If the capability information sent by the terminal in S101 indicates that the terminal has the capability C4, then the terminal calculates the measurement information according to the second PDSCH transmission mode corresponding to the capability C4 based on the above correspondence configured by default to obtain the CSI for feedback.

The system may also be configured with a correspondence between the terminal capability C4 and the first and second PDSCH transmission modes by default. If the capability information sent by the terminal in S101 indicates that the terminal has the capability C4, then the terminal calculates the measurement information respectively according to the first and second PDSCH transmission modes corresponding to the capability C4 based on the above correspondence configured by default to obtain the CSI for feedback.

In some other embodiments, the system is configured with the correspondence between the terminal capability C4 and the first and second PDSCH transmission modes by default, and the terminal may autonomously select at least one of the first and second PDSCH transmission modes corresponding to the capability C4 configured by default, and calculate the measurement information based on the selected PDSCH transmission mode to obtain the CSI for feedback. In one embodiment, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 1-8: The system is configured with a correspondence between the terminal capability C5 and the first PDSCH transmission mode by default. If the capability information sent by the terminal in S101 indicates that the terminal has the capability C5, then the terminal calculates the measurement information according to the first PDSCH transmission mode corresponding to the capability C5 based on the above correspondence configured by default to obtain the CSI for feedback.

Case 1-9: The system is configured with a correspondence between the terminal capability C6 and the first PDSCH transmission mode by default. If the capability information sent by the terminal in S101 indicates that the terminal has the capability C6, then the terminal calculates the measurement information according to the first PDSCH transmission mode corresponding to the capability C6 based on the above correspondence configured by default to obtain the CSI for feedback.

In some embodiments, the network device may instruct the terminal to calculate the CSI based on the PDSCH transmission mode corresponding to the capability information according to the capability information reported by the terminal. According to the indication of the network side, the terminal may calculate the detected measurement information based on the PDSCH transmission mode matching with the capability reported by the terminal to obtain the CSI for feedback.

Here, in some embodiments, the network device may send the indication information to the terminal, to indicate the PDSCH transmission mode based on which the terminal calculates the CSI through the indication information. For example, the indication information may be information of several bits, and different values of these bits correspond to different PDSCH transmission modes.

For example, the network device may send dedicated signaling to the terminal, where the dedicated signaling carries the above indication information, and to send the indication information to the terminal. Here, the dedicated signaling may be RRC (Radio Resource Control) signaling.

For another example, the network device may send dynamic signaling to the terminal, where the dynamic signaling carries the above indication information. Here, the dynamic signaling may be DCI or MAC CE (Media Access Control-Control Element).

For another example, the network device may send dedicated signaling carrying the first indication information to the terminal, and send dynamic signaling carrying the second indication information to the terminal when the PDSCH transmission mode changes, where the first indication information is used to indicate a PDSCH transmission mode set (including at least the first PDSCH transmission mode and the second PDSCH transmission mode), and the second indication information is used to indicate a PDSCH transmission mode in the PDSCH transmission mode set.

In some other embodiments, the network device may send the PDSCH resource allocation information to the terminal, to indicate the time-frequency resources of at least two PDSCHs through the PDSCH resource allocation information, where the PDSCH resource allocation information matches with the capability information sent by the terminal, and the terminal calculates the CSI based on the corresponding PDSCH transmission mode when calculating the CSI.

For example, the network device may send the allocation indication of time-domain and frequency-domain resources of two PDSCHs through the DCI (Downlink Control Information) corresponding to different CORESETPoolindexes, for calculation and measurement of the CSI.

In the following, the network device sends the indication information as an example, to illustrate the implementation process in which the terminal calculates the measurement information based on the PDSCH transmission mode corresponding to the capability information of the terminal to obtain the CSI for feedback. In one embodiment, there may be several cases as follows.

Case 2-1: If the capability information reported by the terminal indicates that the terminal has the capability B1, then the indication information sent by the network device to the terminal indicates the first PDSCH transmission mode, and the terminal calculates the measurement information based on the first PDSCH transmission mode indicated by the indication information to obtain the CSI for feedback.

In some other embodiments, if the capability information reported by the terminal indicates that the terminal has the capability B1, then the indication information sent by the network device to the terminal indicates the second PDSCH transmission mode, and the terminal calculates the measurement information based on the second PDSCH transmission mode indicated by the indication information to obtain the CSI for feedback.

In some other embodiments, if the capability information reported by the terminal indicates that the terminal has the capability B1, then the indication information sent by the network device to the terminal indicates the first and second PDSCH transmission modes, and the terminal calculates the measurement information respectively based on the first and second PDSCH transmission modes according to the first and second PDSCH transmission modes indicated by the indication information to obtain the CSI for feedback.

In some other embodiments, if the capability information reported by the terminal indicates that the terminal has the capability B1, then the indication information sent by the network device to the terminal indicates the first and second PDSCH transmission modes, and the terminal may autonomously select at least one of the first and second PDSCH transmission modes indicated by the indication information, and calculate the measurement information based on the selected PDSCH transmission mode to obtain the CSI for feedback. In some embodiments, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 2-2: If the capability information reported by the terminal indicates that the terminal has the capability B2, then the indication information sent by the network device to the terminal indicates the first PDSCH transmission mode, and the terminal calculates the measurement information based on the first PDSCH transmission mode indicated by the indication information to obtain the CSI for feedback.

Case 2-3: If the capability information reported by the terminal indicates that the terminal has the capability C1, then the indication information sent by the network device to the terminal indicates the first PDSCH transmission mode, and the terminal calculates the measurement information based on the first PDSCH transmission mode indicated by the indication information to obtain the CSI for feedback.

Case 2-4: If the capability information reported by the terminal indicates that the terminal has the capability C2, then the indication information sent by the network device to the terminal indicates the first PDSCH transmission mode, and the terminal calculates the measurement information based on the first PDSCH transmission mode indicated by the indication information to obtain the CSI for feedback.

Case 2-5: If the capability information reported by the terminal indicates that the terminal has the capability C3, then the indication information sent by the network device to the terminal indicates the first PDSCH transmission mode, and the terminal calculates the measurement information based on the first PDSCH transmission mode indicated by the indication information to obtain the CSI for feedback.

In some other embodiments, if the capability information reported by the terminal indicates that the terminal has the capability C3, then the indication information sent by the network device to the terminal indicates the second PDSCH transmission mode, and the terminal calculates the measurement information based on the second PDSCH transmission mode indicated by the indication information to obtain the CSI for feedback.

In some other embodiments, if the capability information reported by the terminal indicates that the terminal has the capability C3, then the indication information sent by the network device to the terminal indicates the first and second PDSCH transmission modes, and the terminal calculates the measurement information respectively based on the first and second PDSCH transmission modes according to the first and second PDSCH transmission modes indicated by the indication information to obtain the CSI for feedback.

In some other embodiments, if the capability information reported by the terminal indicates that the terminal has the capability C3, then the indication information sent by the network device to the terminal indicates the first and second PDSCH transmission modes, and the terminal may autonomously select at least one of the first and second PDSCH transmission modes indicated by the indication information, and calculate the measurement information based on the selected PDSCH transmission mode to obtain the CSI for feedback. In one embodiment, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 2-6: If the capability information reported by the terminal indicates that the terminal has the capability C4, then the indication information sent by the network device to the terminal indicates the first PDSCH transmission mode, and the terminal calculates the measurement information based on the first PDSCH transmission mode indicated by the indication information to obtain the CSI for feedback.

In some other embodiments, if the capability information reported by the terminal indicates that the terminal has the capability C4, then the indication information sent by the network device to the terminal indicates the second PDSCH transmission mode, and the terminal calculates the measurement information based on the second PDSCH transmission mode indicated by the indication information to obtain the CSI for feedback.

In some other embodiments, if the capability information reported by the terminal indicates that the terminal has the capability C4, then the indication information sent by the network device to the terminal indicates the first and second PDSCH transmission modes, and the terminal calculates the measurement information respectively based on the first and second PDSCH transmission modes according to the first and second PDSCH transmission modes indicated by the indication information to obtain the CSI for feedback.

In some other embodiments, if the capability information reported by the terminal indicates that the terminal has the capability C4, then the indication information sent by the network device to the terminal indicates the first and second PDSCH transmission modes, and the terminal may autonomously select at least one of the first and second PDSCH transmission modes indicated by the indication information, and calculate the measurement information based on the selected PDSCH transmission mode to obtain the CSI for feedback. In one embodiment, if the terminal selects the first PDSCH transmission mode, the CSI is calculated based on the first PDSCH transmission mode; if the terminal selects the second PDSCH transmission mode, the CSI is calculated based on the second PDSCH transmission mode; if the terminal selects the first and second PDSCH transmission modes, the CSI is calculated respectively based on the first and second PDSCH transmission modes.

Case 2-7: If the capability information reported by the terminal indicates that the terminal has the capability C5, then the indication information sent by the network device to the terminal indicates the first PDSCH transmission mode, and the terminal calculates the measurement information based on the first PDSCH transmission mode indicated by the indication information to obtain the CSI for feedback.

Case 2-8: If the capability information reported by the terminal indicates that the terminal has the capability C6, then the indication information sent by the network device to the terminal indicates the first PDSCH transmission mode, and the terminal calculates the measurement information based on the first PDSCH transmission mode indicated by the indication information to obtain the CSI for feedback.

In the following, the network device sends the PDSCH resource allocation information to the terminal as an example, to illustrate the implementation process in which the terminal calculates the measurement information based on the PDSCH transmission mode corresponding to the capability information of the terminal to obtain the CSI for feedback. In one embodiment, there may be several cases as follows.

Case 3-1: If the capability information reported by the terminal indicates that the terminal has the capability A, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

Here, the first PDSCH time-frequency resource is: at least two PDSCHs that overlap in the time domain and do not overlap in the frequency domain; and the PDSCH transmission mode corresponding to the first PDSCH time-frequency resource is: a transmission mode in which at least two PDSCHs overlap in the time domain and do not overlap in the frequency domain.

Case 3-2: If the capability information reported by the terminal indicates that the terminal has the capability B1, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

In some other embodiments, if the capability information reported by the terminal indicates that the terminal has the capability B1, then the PDSCH resource allocation information sent by the network device to the terminal indicates the second PDSCH time-frequency resource, and accordingly, the terminal calculates the measurement information based on the corresponding PDSCH transmission mode according to the second PDSCH time-frequency resource indicated by the PDSCH resource allocation information to obtain the CSI for feedback.

Here, for the relevant description of the first PDSCH time-frequency resource and the corresponding PDSCH transmission mode, reference may be made to the foregoing description. The second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain.

Case 3-3: If the capability information reported by the terminal indicates that the terminal has the capability B2, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

Here, for the relevant description of the first PDSCH time-frequency resource and the corresponding PDSCH transmission mode, reference may be made to the foregoing description.

Case 3-4: If the capability information reported by the terminal indicates that the terminal has the capability C1, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

In some other embodiments, if the capability information reported by the terminal indicates that the terminal has the capability C1, then the PDSCH resource allocation information sent by the network device to the terminal indicates the third PDSCH time-frequency resource, and accordingly, the terminal calculates the measurement information based on the corresponding PDSCH transmission mode according to the third PDSCH time-frequency resource indicated by the PDSCH resource allocation information to obtain the CSI for feedback.

Here, for the relevant description of the first PDSCH time-frequency resource and the corresponding PDSCH transmission mode, reference may be made to the foregoing description. The third PDSCH time-frequency resource is: at least two PDSCHs that partially overlap in the time domain, and the PDSCH transmission mode corresponding to the third PDSCH time-frequency resource is: a transmission mode in which at least two PDSCHs overlap in the time domain and do not overlap in the frequency domain.

Case 3-5: If the capability information reported by the terminal indicates that the terminal has the capability C2, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

Here, for the relevant description of the first PDSCH time-frequency resource and the corresponding PDSCH transmission mode, reference may be made to the foregoing description.

Case 3-6: If the capability information reported by the terminal indicates that the terminal has the capability C3, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

In some other embodiments, if the capability information reported by the terminal indicates that the terminal has the capability C3, then the PDSCH resource allocation information sent by the network device to the terminal indicates the second PDSCH time-frequency resource, and accordingly, the terminal calculates the measurement information based on the corresponding PDSCH transmission mode according to the second PDSCH time-frequency resource indicated by the PDSCH resource allocation information to obtain the CSI for feedback.

In some other embodiments, if the capability information reported by the terminal indicates that the terminal has the capability C3, then the PDSCH resource allocation information sent by the network device to the terminal indicates the third PDSCH time-frequency resource, and accordingly, the terminal calculates the measurement information based on the corresponding PDSCH transmission mode according to the third PDSCH time-frequency resource indicated by the PDSCH resource allocation information to obtain the CSI for feedback.

Here, for the relevant description of the first PDSCH time-frequency resource and the corresponding PDSCH transmission mode, the relevant description of the second PDSCH time-frequency resource and the corresponding PDSCH transmission mode, and the relevant description of the third PDSCH time-frequency resource and the corresponding PDSCH transmission mode, reference may be made to the foregoing description.

Case 3-7: If the capability information reported by the terminal indicates that the terminal has the capability C4, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

In some other embodiments, if the capability information reported by the terminal indicates that the terminal has the capability C4, then the PDSCH resource allocation information sent by the network device to the terminal indicates the third PDSCH time-frequency resource, and accordingly, the terminal calculates the measurement information based on the corresponding PDSCH transmission mode according to the third PDSCH time-frequency resource indicated by the PDSCH resource allocation information to obtain the CSI for feedback.

Here, for the relevant description of the first PDSCH time-frequency resource and the corresponding PDSCH transmission mode, and the relevant description of the third PDSCH time-frequency resource and the corresponding PDSCH transmission mode, reference may be made to the foregoing description.

Case 3-8: If the capability information reported by the terminal indicates that the terminal has the capability C5, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

In some other embodiments, if the capability information reported by the terminal indicates that the terminal has the capability C5, then the PDSCH resource allocation information sent by the network device to the terminal indicates the second PDSCH time-frequency resource, and accordingly, the terminal calculates the measurement information based on the corresponding PDSCH transmission mode according to the second PDSCH time-frequency resource indicated by the PDSCH resource allocation information to obtain the CSI for feedback.

Here, for the relevant description of the first PDSCH time-frequency resource and the corresponding PDSCH transmission mode, and the relevant description of the second PDSCH time-frequency resource and the corresponding PDSCH transmission mode, reference may be made to the foregoing description.

Case 3-9: If the capability information reported by the terminal indicates that the terminal has the capability C6, then the PDSCH resource allocation information sent by the network device to the terminal indicates the first PDSCH time-frequency resource, and accordingly, the terminal calculates the measurement information based on the corresponding PDSCH transmission mode according to the first PDSCH time-frequency resource indicated by the PDSCH resource allocation information to obtain the CSI for feedback.

Here, for the relevant description of the first PDSCH time-frequency resource and the corresponding PDSCH transmission mode, reference may be made to the foregoing description.

Based on embodiments of the disclosure further provides a terminal, which can implement the method on the terminal side in the above-mentioned embodiments.

Figure 3:
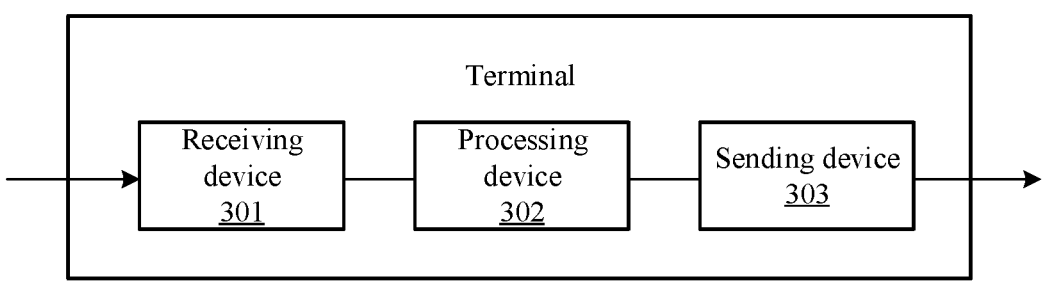
FIG. 3 exemplarily shows a structural schematic diagram of a terminal In some embodiments.

Referring to FIG. 3, which is a structural schematic diagram of a terminal according to an embodiment of the disclosure, this terminal can implement the functions implemented by the terminal in FIG. 1. As shown in the figure, this terminal may include: a receiving device 301, a processing device 302 and a sending device 303, where:

the sending device 303 is configured to send capability information of the terminal to a network device;

the processing device 302 is configured to measure a downlink reference signal sent by the network device to obtain measurement information, and calculate the measurement information based on a PDSCH transmission mode corresponding to the capability information to obtain CSI for feedback;

the sending device 303 is further configured to send the CSI to the network device.

It should be noted here that the terminal provided in this embodiment of the disclosure can implement all the method steps implemented in the above-mentioned method embodiments and can achieve the same effects. The parts and beneficial effects in this embodiment same as those in the method embodiments will not be described here in detail.

Embodiment of the disclosure further provides a network device, which can implement the method on the network device side in the above-mentioned embodiments.

Figure 4:
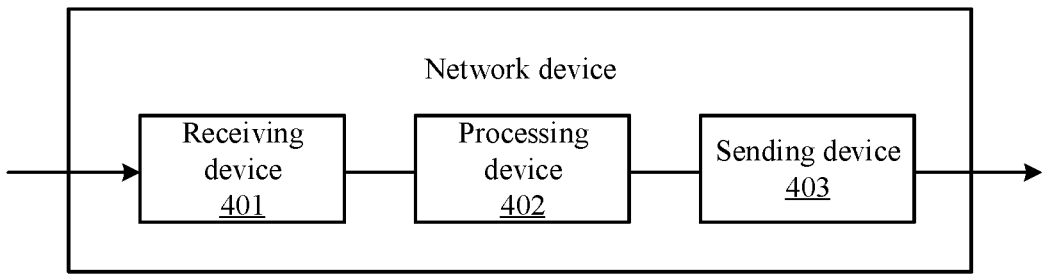
FIG. 4 exemplarily shows a structural schematic diagram of a network device In some embodiments.

Referring to FIG. 4, which is a structural schematic diagram of a network device according to an embodiment of the disclosure, this network device can implement the functions implemented by the network device in FIG. 2. As shown in the figure, this network device may include: a receiving device 401, a processing device 402 and a sending device 403, where:

the receiving device 401 is configured to receive capability information of a terminal sent by the terminal;

the receiving device 401 is further configured to receive CSI sent by the terminal, where the CSI is obtained by the terminal by calculating measurement information of a downlink reference signal based on a PDSCH transmission mode corresponding to the capability information.

It should be noted here that the network device provided in this embodiment of the disclosure can implement all the method steps implemented in the above-mentioned method embodiment and can achieve the same effects. The parts and beneficial effects in this embodiment same as those in the method embodiment will not be described here in detail.

Embodiments of the disclosure further provides a terminal, which can implement the method on the terminal side in the above-mentioned embodiments.

Figure 5:
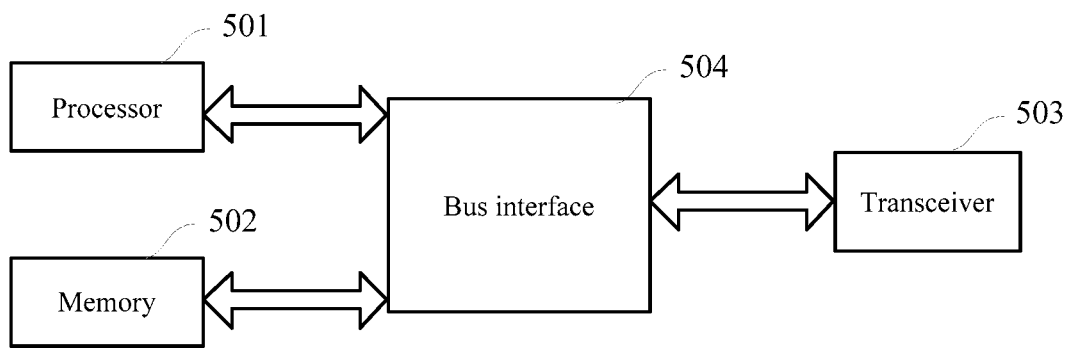
FIG. 5 exemplarily shows a structural schematic diagram of a terminal in another embodiment of the disclosure.

Referring to FIG. 5, it is a structural schematic diagram of the terminal provided by the embodiment of the disclosure. As shown in the figure, the terminal may include: a processor 501, a memory 502, a transceiver 503 and a bus interface 504.

The processor 501 is responsible for managing the bus architecture and general processing, and the memory 502 may store the data used by the processor 501 when performing the operations. The transceiver 503 is configured to receive and send the data under the control of the processor 501.

The bus architecture may include any numbers of interconnected buses and bridges, and may link various circuits of one or more processors represented by the processor 501 and the memory represented by the memory 502. The bus architecture may further link various other circuits such as peripheral device, voltage regulator and power management circuit, which are all well known in the art and thus will not be further described again herein. The bus interface provides an interface. The processor 501 is responsible for managing the bus architecture and general processing, and the memory 502 may store the data used by the processor 501 when performing the operations.

The procedure disclosed by the embodiment of the disclosure may be applied in the processor 501 or implemented by the processor 501. In the implementation process, each step of the signal processing flow may be completed by the integrated logic circuit of hardware in the processor 501 or the instruction in the form of software. The processor 501 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 502, and the processor 501 reads the information in the memory 502 and completes the steps of the signal processing flow in combination with its hardware.

In some embodiments, the processor 501 is configured to read the computer instructions in the memory 502 and execute the functions implemented by the terminal in the embodiments of the disclosure.

It should be noted here that the above-mentioned terminal provided in this embodiment of the disclosure can implement all the method steps implemented by the terminal in the above-mentioned method embodiments and can achieve the same effects. The parts and beneficial effects in this embodiment same as those in the method embodiments will not be described here in detail.

An embodiment of the disclosure further provides a network device. The network device can implement the functions of the network device side in the foregoing embodiments.

Figure 6:
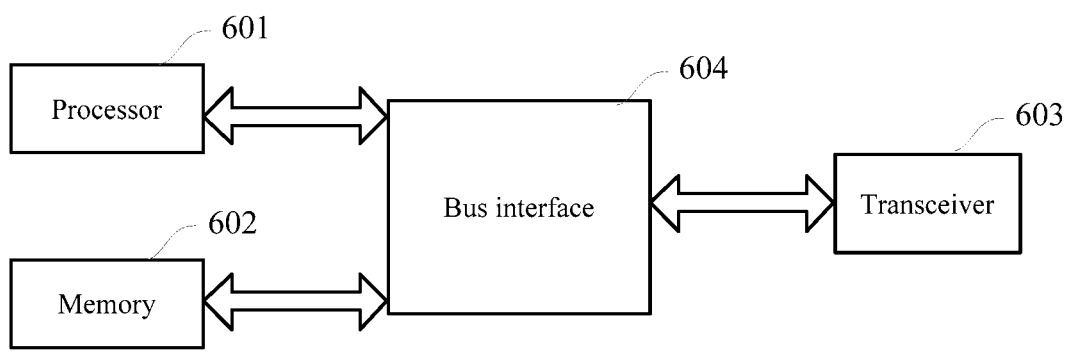
FIG. 6 exemplarily shows a structural schematic diagram of a network device in another embodiment of the disclosure.

Referring to FIG. 6, it is a structural schematic diagram of the network device provided by the embodiment of the disclosure. As shown in the figure, the network device may include: a processor 601, a memory 602, a transceiver 603 and a bus interface 604.

The processor 601 is responsible for managing the bus architecture and general processing, and the memory 602 may store the data used by the processor 601 when performing the operations. The transceiver 603 is configured to receive and send the data under the control of the processor 601.

The bus architecture may include any numbers of interconnected buses and bridges, and may link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface provides an interface. The processor 601 is responsible for managing the bus architecture and general processing, and the memory 602 may store the data used by the processor 601 when performing the operations.

The procedure disclosed by the embodiment of the disclosure may be applied in the processor 601 or implemented by the processor 601. In the implementation process, each step of the signal processing flow may be completed by the integrated logic circuit of hardware in the processor 601 or the instruction in the form of software. The processor 601 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 602, and the processor 601 reads the information in the memory 602 and completes the steps of the signal processing flow in combination with its hardware.

In one embodiment, the processor 601 is configured to read the computer instructions in the memory 602 and execute the functions implemented by the terminal in the embodiments of the disclosure.

It should be noted here that the above-mentioned network device provided in this embodiment of the disclosure can implement all the method steps implemented by the network device in the above-mentioned method embodiment and can achieve the same effects. The parts and beneficial effects in this embodiment same as those in the method embodiment will not be described here in detail.

An embodiment of the disclosure further provides a computer readable storage medium storing computer executable instructions which are configured to cause the computer to execute the method performed by the terminal in the above-mentioned embodiments.

An embodiment of the disclosure further provides a computer readable storage medium storing computer executable instructions which are configured to cause the computer to execute the method performed by the network device in the above-mentioned embodiments.

The embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for feeding back Channel State Information (CSI), comprising:
    sending, by a terminal, capability information of the terminal to a network device;
    measuring, by the terminal, a downlink reference signal sent by the network device to obtain measurement information;
    calculating, by the terminal, the measurement information based on a Physical Downlink Shared Channel (PDSCH) transmission mode corresponding to the capability information to obtain CSI for feedback; and
    sending, by the terminal, the CSI to the network device;
    wherein the calculating, by the terminal, the measurement information based on the PDSCH transmission mode corresponding to the capability information to obtain the CSI for feedback, comprises:
    calculating the measurement information based on a first PDSCH transmission mode to obtain the CSI for feedback, in a case that the capability information indicates that the terminal supports at least two PDSCHs that overlap in a time domain and do not overlap in a frequency domain; or
    calculating the measurement information based on a first PDSCH transmission mode and/or a second PDSCH transmission mode to obtain the CSI for feedback, in a case that the capability information indicates that the terminal supports at least two PDSCHs that overlap in a time domain and do not overlap in a frequency domain, and the terminal supports the at least two PDSCHs with completely overlapped time-frequency resources; or
    calculating the measurement information based on a first PDSCH transmission mode to obtain the CSI for feedback, in a case that the capability information indicates that the terminal supports at least two PDSCHs that overlap in a time domain and do not overlap in a frequency domain, and the terminal does not support the at least two PDSCHs with completely overlapped time-frequency resources; or
    calculating the measurement information based on a first PDSCH transmission mode to obtain the CSI for feedback, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources;
    wherein the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; in a case that calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

2. The method according to claim 1, wherein the calculating, by the terminal, the measurement information based on the PDSCH transmission mode corresponding to the capability information to obtain the CSI for feedback, comprises:
    calculating the measurement information based on the PDSCH transmission mode corresponding to the capability information according to a default configuration or indication information sent by the network device to obtain the CSI for feedback;
    wherein the default configuration and the indication information are configured to indicate the PDSCH transmission mode based on which the terminal calculates the CSI, and the PDSCH transmission mode indicated by the indication information matches with the capability information of the terminal.

3. The method according to claim 1, wherein the calculating, by the terminal, the measurement information based on the PDSCH transmission mode corresponding to the capability information to obtain the CSI for feedback, comprises:
    receiving PDSCH resource allocation information sent by the network device, wherein the PDSCH resource allocation information is configured to indicate time-frequency resources of at least two PDSCHs, and the PDSCH resource allocation information matches with the capability information sent by the terminal;
    calculating the measurement information based on a PDSCH transmission mode corresponding to the PDSCH resource allocation information to obtain the CSI for feedback.

4. The method according to claim 3, wherein the calculating the measurement information based on the PDSCH transmission mode corresponding to the PDSCH resource allocation information to obtain the CSI for feedback, comprises:
  calculating the measurement information based on a PDSCH transmission mode corresponding to a first PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain; or
  calculating the measurement information based on a PDSCH transmission mode corresponding to a first PDSCH time-frequency resource or a second PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain, and the terminal supports the at least two PDSCHs with completely overlapped time-frequency resources; or
  calculating the measurement information based on a PDSCH transmission mode corresponding to a first PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain, and the terminal does not support the at least two PDSCHs with completely overlapped time-frequency resources; or
  calculating the measurement information based on a PDSCH transmission mode corresponding to a first PDSCH time-frequency resource, a second PDSCH time-frequency resource allocation or a third time-frequency resource allocation indicated by the PDSCH resource allocation information to obtain the CSI for feedback, in a case that the capability information indicates that the terminal supports at least two PDSCHs that overlap in a time domain and do not overlap in a frequency domain, the terminal supports the at least two PDSCHs with partially overlapped time-frequency resources, and the terminal supports the at least two PDSCHs with completely overlapped time-frequency resources; or
  calculating the measurement information based on a PDSCH transmission mode corresponding to a first PDSCH time-frequency resource or a second time-frequency resource allocation indicated by the PDSCH resource allocation information to obtain the CSI for feedback, in a case that the capability information indicates that the terminal supports at least two PDSCHs that overlap in a time domain and do not overlap in a frequency domain, the terminal does not support the at least two PDSCHs with partially overlapped time-frequency resources, and the terminal supports the at least two PDSCHs with completely overlapped time-frequency resources; or
  calculating the measurement information based on a PDSCH transmission mode corresponding to a first PDSCH time-frequency resource or a third time-frequency resource allocation indicated by the PDSCH resource allocation information to obtain the CSI for feedback, in a case that the capability information indicates that the terminal supports at least two PDSCHs that overlap in a time domain and do not overlap in a frequency domain, the terminal supports the at least two PDSCHs with partially overlapped time-frequency resources, and the terminal does not support the at least two PDSCHs with completely overlapped time-frequency resources; or
  calculating the measurement information based on a PDSCH transmission mode corresponding to a first PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources; or
  calculating the measurement information based on a PDSCH transmission mode corresponding to a first PDSCH time-frequency resource or a third PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain, and the terminal supports the at least two PDSCHs with partially overlapped time-frequency resources; or
  calculating the measurement information based on a PDSCH transmission mode corresponding to a first PDSCH time-frequency resource indicated by the PDSCH resource allocation information to obtain the CSI for feedback, in a case that the capability information indicates that the terminal supports at least two PDSCHs that overlap in a time domain and do not overlap in a frequency domain, and the terminal does not support the at least two PDSCHs with partially overlapped time-frequency resources;
  wherein the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain;
  the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain;
  the third PDSCH time-frequency resource is: at least two PDSCHs that partially overlap in the time domain, and the PDSCH transmission mode corresponding to the third PDSCH time-frequency resource is: a transmission mode in which at least two PDSCHs overlap in the time domain and do not overlap in the frequency domain.

5. The method according to claim 1, wherein the calculating the measurement information to obtain the CSI for feedback, comprises:
  calculating the CSI for feedback based on beams corresponding to at least two used downlink reference signal resources to receive at least two PDSCHs, in a case that the terminal uses at least two beams to receive the downlink reference signal;

selecting one of at least two downlink reference signal resources and calculating the CSI for feedback based on using a beam corresponding to the selected downlink reference signal resource to receive the at least two PDSCHs or based on using other beams to receive the at least two PDSCHs, in a case that the terminal uses one beam to receive the downlink reference signal.

6. A computer readable storage medium, wherein the computer readable storage medium stores computer executable instructions configured to cause a computer to perform the method of claim 1.

7. A method for feeding back Channel State Information, (CSI), comprising:
receiving, by a network device, capability information of a terminal sent by the terminal; and
receiving, by the network device, CSI sent by the terminal;
wherein the CSI is obtained by the terminal by calculating measurement information of a downlink reference signal based on a Physical Downlink Shared Channel (PDSCH) transmission mode corresponding to the capability information;
wherein the method further comprises:
instructing, by the network device, the terminal to determine the CSI for feedback based on the PDSCH transmission mode corresponding to the capability information according to the capability information of the terminal;
wherein the instructing, by the network device, the terminal to determine the CSI for feedback based on the PDSCH transmission mode corresponding to the capability information according to the capability information of the terminal, comprises:
sending, by the network device, indication information to the terminal;
wherein the indication information is configured to indicate the PDSCH transmission mode based on which the terminal calculates the CSI, and the PDSCH transmission mode indicated by the indication information matches with the capability information of the terminal;
wherein the sending, by the network device, indication information to the terminal, wherein the indication information is configured to indicate the PDSCH transmission mode based on which the terminal calculates the CSI, comprises:
sending indication information for indicating a first PDSCH transmission mode and/or a second PDSCH transmission mode, in a case that the capability information indicates that the terminal supports at least two PDSCHs that overlap in a time domain and do not overlap in a frequency domain, and the terminal supports the at least two PDSCHs with completely overlapped time-frequency resources; or
sending indication information for indicating a first PDSCH transmission mode, in a case that the capability information indicates that the terminal supports at least two PDSCHs that overlap in a time domain and do not overlap in a frequency domain, and the terminal does not support the at least two PDSCHs with completely overlapped time-frequency resources; or
sending indication information for indicating the first PDSCH transmission mode, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources;
wherein the first PDSCH transmission mode is: a transmission mode in which at least two PDSCHs overlap in the time domain and do not overlap in the frequency domain; and
the second PDSCH transmission mode is: a transmission mode in which at least two PDSCHs completely overlap in the time domain and the frequency domain.

8. The method according to claim 7, wherein the sending, by the network device, indication information to the terminal, comprises:
sending, by the network device, dedicated signaling to the terminal, wherein the dedicated signaling carries the indication information; or
sending, by the network device, dynamic signaling to the terminal, wherein the dynamic signaling carries the indication information; or
sending, by the network device, dedicated signaling carrying first indication information to the terminal, and sending dynamic signaling carrying second indication information to the terminal in a case that the PDSCH transmission mode changes; wherein the first indication information is configured to indicate a PDSCH transmission mode set, and the second indication information is configured to indicate one PDSCH transmission mode in the PDSCH transmission mode set, and the PDSCH transmission mode set at least comprises a first PDSCH transmission mode and a second PDSCH transmission mode;
wherein the first PDSCH transmission mode is: a transmission mode in which at least two PDSCHs overlap in the time domain and do not overlap in the frequency domain; and the second PDSCH transmission mode is: a transmission mode in which at least two PDSCHs completely overlap in the time domain and frequency domain.

9. The method according to claim 7, wherein the instructing, by the network device, the terminal to determine the CSI for feedback based on the PDSCH transmission mode corresponding to the capability information according to the capability information of the terminal, comprises:
sending, by the network device, PDSCH resource allocation information to the terminal;
wherein the PDSCH resource allocation information is configured to indicate time-frequency resources of at least two PDSCHs, and the PDSCH resource allocation information matches with the capability information sent by the terminal.

10. The method according to claim 9, wherein the sending, by the network device, PDSCH resource allocation information to the terminal, wherein the PDSCH resource allocation information is configured to indicate time-frequency resources of at least two PDSCHs, comprises:
sending the PDSCH resource allocation information for indicating a first PDSCH time-frequency resource to the terminal, in a case that the capability information indicates that the terminal supports at least two PDSCHs that overlap in a time domain and do not overlap in a frequency domain; or
sending the PDSCH resource allocation information for indicating a first PDSCH time-frequency resource or a second PDSCH time-frequency resource to the terminal, in a case that the capability information indicates that the terminal supports at least two PDSCHs that overlap in a time domain and do not overlap in a frequency domain, and the terminal supports the at least two PDSCHs with completely overlapped time-frequency resources; or sending the PDSCH resource allocation information for indicating a first PDSCH time-frequency resource to the terminal, in a case that the capability information indicates that the terminal supports at least two PDSCHs that overlap in a time domain and do not overlap in a frequency domain, and the terminal does not support the at least two PDSCHs with completely overlapped time-frequency resources; or sending the PDSCH resource allocation information for indicating a first PDSCH time-frequency resource, a second PDSCH time-frequency resource allocation or a third time-frequency resource allocation to the terminal, in a case that the capability information indicates that the terminal supports at least two PDSCHs that overlap in a time domain and do not overlap in a frequency domain, the terminal supports the at least two PDSCHs with partially overlapped time-frequency resources, and the terminal supports the at least two PDSCHs with completely overlapped time-frequency resources; or sending the PDSCH resource allocation information for indicating a first PDSCH time-frequency resource or a second time-frequency resource allocation to the terminal, in a case that the capability information indicates that the terminal supports at least two PDSCHs that overlap in a time domain and do not overlap in a frequency domain, the terminal does not support the at least two PDSCHs with partially overlapped time-frequency resources, and the terminal supports the at least two PDSCHs with completely overlapped time-frequency resources; or sending the PDSCH resource allocation information for indicating a first PDSCH time-frequency resource or a third time-frequency resource allocation to the terminal, in a case that the capability information indicates that the terminal supports at least two PDSCHs that overlap in a time domain and do not overlap in a frequency domain, the terminal supports the at least two PDSCHs with partially overlapped time-frequency resources, and the terminal does not support the at least two PDSCHs with completely overlapped time-frequency resources; or sending the PDSCH resource allocation information for indicating a first PDSCH time-frequency resource to the terminal, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources; or sending the PDSCH resource allocation information for indicating a first PDSCH time-frequency resource or a third PDSCH time-frequency resource to the terminal, in a case that the capability information indicates that the terminal supports at least two PDSCHs that overlap in a time domain and do not overlap in a frequency domain, and the terminal supports the at least two PDSCHs with partially overlapped time-frequency resources; or sending the PDSCH resource allocation information for indicating a first PDSCH time-frequency resource to the terminal, in a case that the capability information indicates that the terminal supports at least two PDSCHs that overlap in a time domain and do not overlap in a frequency domain, and the terminal does not support the at least two PDSCHs with partially overlapped time-frequency resources;

wherein the first PDSCH time-frequency resource is: at least two PDSCHs that overlap in the time domain and do not overlap in the frequency domain, and the PDSCH transmission mode corresponding to the first PDSCH time-frequency resource is: a transmission mode in which at least two PDSCHs overlap in the time domain and do not overlap in the frequency domain;

the second PDSCH time-frequency resource is: at least two PDSCHs with completely overlapped time-frequency resources, and the PDSCH transmission mode corresponding to the second PDSCH time-frequency resource is: a transmission mode in which at least two PDSCHs completely overlap in the time domain and frequency domain; and the third PDSCH time-frequency resource is: at least two PDSCHs that partially overlap in the time domain, and the PDSCH transmission mode corresponding to the third PDSCH time-frequency resource is: a transmission mode in which at least two PDSCHs overlap in the time domain and do not overlap in the frequency domain.

11. A computer readable storage medium, wherein the computer readable storage medium stores computer executable instructions configured to cause a computer to perform the method of claim 7.

12. A terminal, comprising: a processor, a memory and a transceiver;
the transceiver receives and sends data under control of the processor;
the memory stores computer instructions;
the processor is configured to read the computer instructions to perform:
sending, by a terminal, capability information of the terminal to a network device;
measuring, by the terminal, a downlink reference signal sent by the network device to obtain measurement information;
calculating, by the terminal, the measurement information based on a Physical Downlink Shared Channel (PDSCH) transmission mode corresponding to the capability information to obtain Channel State Information (CSI) for feedback; and
sending, by the terminal, the CSI to the network device;
wherein the processor is further configured to read the computer instructions to perform:
calculating the measurement information based on a first PDSCH transmission mode to obtain the CSI for feedback, in a case that the capability information indicates that the terminal supports at least two PDSCHs that overlap in a time domain and do not overlap in a frequency domain; or
calculating the measurement information based on a first PDSCH transmission mode and/or a second PDSCH transmission mode to obtain the CSI for feedback, in a case that the capability information indicates that the terminal supports at least two PDSCHs that overlap in a time domain and do not overlap in a frequency domain, and the terminal supports the at least two PDSCHs with completely overlapped time-frequency resources; or
calculating the measurement information based on a first PDSCH transmission mode to obtain the CSI for feedback, in a case that the capability information indicates that the terminal supports at least two PDSCHs that overlap in a time domain and do not overlap in a frequency domain, and the terminal does not support the at least two PDSCHs with completely overlapped time-frequency resources; or calculating the measurement information based on a first PDSCH transmission mode to obtain the CSI for feedback, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources;

wherein the first PDSCH transmission mode is: a transmission mode in which at least two PDSCHs overlap in the time domain and do not overlap in the frequency domain; the second PDSCH transmission mode is: a transmission mode in which at least two PDSCHs completely overlap in the time domain and frequency domain; in a case that calculating the measurement information based on the first PDSCH transmission mode and the second PDSCH transmission mode to obtain the CSI for feedback, the measurement information is calculated respectively based on the first PDSCH transmission mode and the second PDSCH transmission mode to obtain the CSI for feedback.

13. The terminal according to claim 12, wherein the processor is further configured to read the computer instructions to perform:

receiving PDSCH resource allocation information sent by the network device, wherein the PDSCH resource allocation information is configured to indicate time-frequency resources of at least two PDSCHs, and the PDSCH resource allocation information matches with the capability information sent by the terminal; and calculating the measurement information based on a PDSCH transmission mode corresponding to the PDSCH resource allocation information to obtain the CSI for feedback.

14. A network device, comprising a processor, a memory and a transceiver;

the transceiver receives and sends data under control of the processor;

the memory stores computer instructions;

the processor is configured to read the computer instructions to perform:

receiving capability information of a terminal sent by the terminal; and receiving Channel State Information (CSI) sent by the terminal;

wherein the CSI is obtained by the terminal by calculating measurement information of a downlink reference signal based on a Physical Downlink Shared Channel (PDSCH) transmission mode corresponding to the capability information;

wherein the processor is further configured to read the computer instructions to perform:

instructing, by the network device, the terminal to determine the CSI for feedback based on the PDSCH transmission mode corresponding to the capability information according to the capability information of the terminal;

wherein the processor is further configured to read the computer instructions to perform:

sending, by the network device, indication information to the terminal;

wherein the indication information is configured to indicate the PDSCH transmission mode based on which the terminal calculates the CSI, and the PDSCH transmission mode indicated by the indication information matches with the capability information of the terminal;

wherein the processor is further configured to read the computer instructions to perform:

sending indication information for indicating a first PDSCH transmission mode and/or a second PDSCH transmission mode, in a case that the capability information indicates that the terminal supports at least two PDSCHs that overlap in a time domain and do not overlap in a frequency domain, and the terminal supports the at least two PDSCHs with completely overlapped time-frequency resources; or sending indication information for indicating a first PDSCH transmission mode, in a case that the capability information indicates that the terminal supports at least two PDSCHs that overlap in a time domain and do not overlap in a frequency domain, and the terminal does not support the at least two PDSCHs with completely overlapped time-frequency resources; or sending indication information for indicating the first PDSCH transmission mode, in a case that the capability information indicates that the terminal supports at least two PDSCHs that overlap in a time domain and do not overlap in a frequency domain, the terminal does not support the at least two PDSCHs with partially overlapped time-frequency resources, and the terminal does not support the at least two PDSCHs with completely overlapped time-frequency resources;

wherein the first PDSCH transmission mode is: a transmission mode in which at least two PDSCHs overlap in the time domain and do not overlap in the frequency domain; and the second PDSCH transmission mode is: a transmission mode in which at least two PDSCHs completely overlap in the time domain and the frequency domain.

* * * * *